United States Patent Office 3,287,205
Patented Nov. 22, 1966

3,287,205
LOW TEMPERATURE BONDING THERMOPLASTIC POLYHYDROXYETHER ADHESIVE COMPOSITIONS
Thomas E. Bugel, Metuchen, N.J., assignor to Union Carbide Corporation, a corporation of New York
No Drawing. Filed Sept. 24, 1962, Ser. No. 225,850
13 Claims. (Cl. 161—192)

This invention relates to thermoplastic polyhydroxyether adhesive compositions which bond with great strength at low temperatures. More particularly, the invention relates to thermoplastic polyhydroxyether compositions which develop at low temperatures bond strengths heretofore achieved only at temperatures several hundred Fahrenheit degrees higher.

As the use of thermoplastic polyhydroxyether as an adhesive has widened to include adhesion to a great variety of substrates it has become apparent that the high bonding temperatures used for maximum strength e.g., 600 to 700° F. subtly affected certain substrates. For example, aluminum laminae were sometimes annealed during the bonding operation. It was desirable, therefore, to reduce the bonding temperatures, but importantly, without a sacrifice in final bond strength, and if possible without loss of the other numerous advantageous properties of thermoplastic polyhydroxyether.

It has now been discovered that the bonding temperature required to obtain maximum bond strength with thermoplastic polyhydroxyether can be lowered by 100 to 200 Fahrenheit degrees and more by the presence of poly(vinyl alkyl ether) in the thermoplastic polyhydroxyether.

Adhesive compositions have now been found which provide the outstanding bond strengths, creep resistance, and versatility of thermoplastic polyhydroxyether, but which develop maximum bond strength at surprisingly lower temperatures than straight polyhydroxyether, i.e. polyhydroxyether not blended with poly(vinyl alkyl ether). The thermoplastic polyhydroxyether compositions of the present invention can be applied to adherends from solution as by spraying, dipping, brush flow coating, impregnation or the like; by melt applying as in extrusion coating, powder coating, flame spraying, and fluid bed coating or the like; and importantly by film laminating.

It is a significant advantage of the thermoplastic polyhydroxyether compositions herein described as an adhesive bonding material that they are available in the form of a flat sheet or as film on a roll. Some of the advantages gained by use of thermoplastic polyhydroxyether composition films as an adhesive material include:

(1) A single component system, no mixing to form the adhesive
(2) Unlimited shelf life
(3) No liquids to be handled
(4) No volatiles
(5) No priming of the adherend necessary
(6) No prolonged curing cycles
(7) Bonds of great strength obtained
(8) Readily controllable glue line thickness
(9) Absolute freedom from pinholes
(10) Ultra-thin laminates feasible
(11) Lower cost because less material required
(12) No necessity of supporting web for a film adhesive
(13) Thermoplastic films are readily produced by variety of inexpensive means
(14) Reproducible bonding effects; no vagaries due to cure cycles and storage There has not been known prior to thermoplastic polyhydroxyether a thermoplastic material possessing the above attributes. In fact, there has not been known a widely adhesive thermoplastic film. Now with the compositions of the present invention the advantageous attributes of thermoplastic polyhydroxyether can be taken advantage of with many more substrates such as paper, wood, heat sensitive steels and aluminum.

The thermoplastic polyhydroxyether adhesive compositions herein described lend themselves to coating virtually any surface having any contour. Moreover, a coating of the thermoplastic polyhydroxyether adhesive compositions is in itself a base material or primer to which other materials can be bonded using the thermoplastic polyhydroxyether composition as the adhesive.

Although thermosetting adhesive films are known their properties and advantages do not begin to compare with those of the thermoplastic polyhydroxyether composition adhesive films described herein. Whereas a thermosetting film requires a chemical reaction to bond, the thermoplastic polyhydroxyether adhesive compositions of this invention require only as much temperature and pressure as is necessary to make the composition flow into intimate contact with the adherend. This can be a matter of a few seconds or only a brief fraction of a second. A summary of advantages of thermoplastic polyhydroxyether composition adhesive films over a typical thermosetting resin film, phenolic nitrile, is presented in Table I.

TABLE I

Comparison of Storage, Handling, and Application Conditions for Bonding Films

| Class | Thermosetting | Thermoplastic |
|---|---|---|
| Type of resin | Phenolic nitrile | Polyhydroxyether. |
| Form | Unsupported film, polyethylene liner. | Unsupported film, no liner. |
| Volatile content | Film exposed for 1 hour at 350° F., less than 5% weight loss. | 0. |
| Class | Thermosetting | Thermoplastic. |
| Bond Temperature | Minimum 257° F.; 60 min. at 350° F. and 150 p.s.i. recommended to cure. | 300 to 550° F. depending on substrate, bonds within seconds or less had low pressures. |
| Maximum storage | 6 months at less than 40° F. | Indefinite. |

The thermoplastic polyhydroxether adhesive compositions of the present invention are, as illustrated in Table I, in essentially final chemical form and need only be caused to flow for a moment in order to be activated into bonding to an adherend. Activation is by heating either the substrate and pressing the thermoplastic polyhydroxyether adhesive composition thereagainst or heating the themoplastic polyhydroxyether adhesive composition in some maner e.g., radiant heating convection, induction, electrically, ultrasonically, et cetera and pressing the adherend against the polymer or a heated particulate adherend can be blown against the thermoplastic polyhydroxyether adhesive composition. The superiority of thermoplastic polyhydroxether adhesive compositions over other thermoplastics in terms of bond strength is shown in Table II following.

TABLE II

| Thermoplastic | Press Temp., °F. | Dwell Time, Seconds | Average Lap Shear Strength,* (p.s.i.) |
|---|---|---|---|
| Polyhydroxyether/ Poly(vinyl ethyl ether) (90/10) | 500 | 90 | 4,070 |
| Polyhydroxyether | 500 | 90 | 1,500 |
| Do | 700 | 40 | 2,850 |
| Polystyrene | 700 | 40 | 600 |
| Vinyl Chloride/Vinyl Acetate Copolymer | 500 | 40 | 570 |
| Polyethylene | 700 | 40 | 770 |
| Polyester | 700 | 40 | 780 |
| Vinyl Chloride/Vinyl Acetate/Maleic Acid Copolymer | 600 | 20 | 1,060 |

*ASTM D–1002.

In general, what is requied to adhere the thermoplastic polyhydroxyether adhesive compositions to an adherend is to flux the composition at the interface of the two materials. Fluxing is flow under heat and usually pressure and is most easily accomplished by the input of sufficient heat into the area to be bonded. It is to be emphasized the actual flow is not necessary because the polyhydroxyether composition can be activated into bonding without flow as occurs for example in some solution coatings. Generally a short bake at moderate temperatures improves the bond obtained from solution coatings. The use of pressure also assists in obtaining good bonding. Typical of amorphous thermoplastics, polyhydroxyethers have no distinct melting point or a narrow melting range but rather soften over a wide temperature range. At the low end of the softening range heat alone may not be sufficient to flux the resin as it is sufficient at the high end of the range, but a combination of mild heat and pressure will cause the polyhydroxether compositions to flow.

The terms "structural element" and "structural elements" as used herein refer to an assembly or assemblies of one or more discrete, planar, curvilinear, rectangular, round, or odd shaped objects and theroplastic polyhydroxyether adhesive composition. The assembly is characterized by an adhesive bond between the thermoplastic polyhydroxyether adhesive composition and the object or objects. The term comprehends, therefore, structural elements comprising an adherend such as a substrate and an adhering layer of thermoplastic polyhydroxyether adhesive composition as in a two-ply laminate or a coated substrate; structural elements comprising an interlayer of thermoplastic polyhydroxyether adhesive composition sandwiched between and adhered to two similar dissimilar adherends or laminae as in a plural ply laminate; structural elements comprising a thermoplastic polyhydroxyether adhesive composition matrix surrounding and adhered to as a bond and/or a support for variously shaped and sized adherends such as articles of varying porosities, e.g., as the bonding agent and/or substrate in "sandpaper" and fiber reinforced plastic articles; structural elements comprising structural members bonded together either closely adjacent or spaced apart by the thermoplastic polyhydroxyether adhesive composition elements and combinations of the foregoing. The adherend preferably is readily wettable by the thermoplastic polyhydroxyether adhesive compositions either because of a surface pretreatment or cleanliness and/or because of its nature i.e. a polar nature such as characterizes metals, glass, and wood and is absent in polyethylene, or for any other reason.

Poly(vinyl alkyl ethers) are relatively low molecular weight polymeric materials which have found widespread use as pressure sensitive adhesives. A typical poly(vinyl alkyl ether) is poly(vinyl ethyl ether). Its preparation can be carried out as follows.

There is charged to a 3 liter 3 neck flask equipped with condenser and stirrer vinyl ethyl ether monomer and a solvent, such as pentane, in a ratio of 30 to 70 of monomer to solvent. As a catalyst, a combined form of sulfuric acid and aluminum sulfate, e.g., aluminum hexahydrosulfate heptahydrate $(Al_2(H_2SO_4)_6 \cdot 7H_2O)$ is added to the charge in an amount sufficient to initiate reaction e.g. from 0.002 to 0.04 percent based in the vinyl ethyl ether. Heat is then applied and a modest reflux rate maintained with further catalyst additions periodically until polymerization is initiated as evidenced by a thickening of the reaction mass, an increase in the reflux rate and the appearance of foam. Excessive reflux or foaming can be prevented by application of Dry Ice-acetone bath. At the end of the polymerization, indicated by the cessation of reflux, the catalyst is neutralized by addition of a weak base, e.g. ammonium hydroxide.

Poly(vinyl alkyl ethers) contemplated herein are those wherein the alkyl group contains from 1 to 12 carbon atoms inclusive. Among others there can be mentioned, poly(vinyl methyl ether), poly(vinyl ethyl ether), poly(vinyl n-propyl ether), poly(vinyl isopropyl ether), poly(vinyl n-butyl ether), poly(vinyl isobutyl ether), poly(vinyl decyl ethers) and the like.

Preferred poly(vinyl alkyl ethers) are the poly(vinyl ethyl ethers), particularly those having reduced viscosities of from 0.25 to 6.0 measured as a 0.1 gram sample in 100 milliliters of benzene at 20° C.

Reduced viscosity herein is defined as the specific viscosity (i.e., the viscosity of the solution minus the viscosity of the solvent divided by the viscosity of the solvent) divided by the concentration of the solution.

The term "thermoplastic polyhydroxyether" herein refers to substantially linear polymers having the general formula

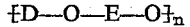

wherein D is the radical residium of a dihydric phenol, E is an hydroxyl containing radical residium of an epoxide, and $n$ represents the degree of polymerization and is at least 30 and is preferably 80 or more. The term "thermoplastic polyhydroxyether" is intended to include mixtures of at least two thermoplastic polyhydroxyethers.

The dihydric phenol contributing the phenol radical residium, D, can be either a dihydric mononuclear phenol such as hydroquinone and resorcinol or a dihydric polynuclear phenol such as those having the general formula

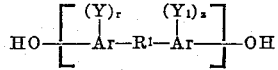

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms i.e. fluorine, chlorine, bromine and iodine, or alkoxy radicals, preferably having from 1 to 4 carbon atoms $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example,

—O—, —S—, —SO—, —SO$_2$—, and —S—S—, and divalent hydrocarbon radicals such as alkylene, alkylidene, cycloaliphatic e.g. cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include, among others:

The bis(hydroxyphenyl)-alkanes such as 2,2-bis(4-hydroxyphenyl)propane,
2,4'-dihydroxydiphenylmethane,
bis(2-hydroxyphenyl)methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorphenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl)-1,2-bis(phenyl)propane,
2,2-bis(4-hydroxyphenyl)-1-phenyl-propane and the like;

Di(hydroxyphenyl)sulfones such as bis(4-hydroxy-phenyl)sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

Di(hydroxyphenyl)ethers such as bis(4-hydroxyphenyl)-ether,
the 4,3'-, 4,2'-, 2,2'-, 2,3'- dihydroxydiphenyl ethers,
4,4'-dihydroxy-2,6-dimethyldiphenyl ether,
bis(4-hydroxy-3-isobutylphenyl)-ether,
bis(4-hydroxy-3-isopropylphenyl)-ether,
bis(4-hydroxy-3-chlorophenyl)-ether,
bis(4-hydroxy-3-fluorophenyl)-ether,
bis(4-hydroxy-3-bromophenyl)-ether,
bis(4-hydroxynaphthyl)-ether,
bis(4-hydroxy-3-chloronaphthyl)-ether,
bis(2-hydroxydiphenyl)-ether,
4,4'-dihydroxy-2,6-dimethoxydiphenyl ether,
4,4'-dihydroxy-2,5-diethoxydiphenyl ether, and the like;

Also suitable are the bisphenol reaction products of 4-vinylcyclohexene and phenols, e.g., 1,3-bis(p-hydroxyphenyl)-1-ethylcyclohexane, and the bisphenol reaction products of dipentene or its isomers and phenols such as 1,2-bis(p-hydroxyphenyl)-1-methyl-4-isopropylcyclohexane as well as bisphenols such as 1,3,3-trimethyl-1-(4 - hydroxyphenyl) - 6 - hydroxyindane, and 2,4 - bis(4-hydroxyphenyl)-4-methylpentane, and the like.

Particularly desirable dihydric polynuclear phenols have the formula

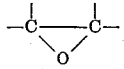

wherein Y and Y₁ are as previously defined r and z have values from 0 to 4 inclusive and R¹ is a divalent saturated aliphatic hydrocarbon radical, particularly alkylene and alkylidene radicals having from 1 to 3 carbon atoms, and cycloalkylene radicals having up to and including 9 carbon atoms.

Mixtures of dihydric phenols can also be employed and whenever the term "dihydric phenol" or "dihydric polynuclear phenol" is used herein mixtures of these compounds are intended to be included.

The epoxide contributing the hydroxyl containing radical residium E, can be a monoepoxide or diepoxide. By "epoxide" is meant a compound containing an oxirane group, i.e., oxygen bonded to two vicinal aliphatic carbon atoms, thus

A monoepoxide contains one such oxirane group and provides a radical residium E containing a single hydroxyl group; a diepoxide contains two such oxirane groups and provides a radical residium E containing two hydroxyl groups. Saturated epoxides, by which term is meant diepoxides free of ethylenic unsaturation, i.e., $>C=C<$ and acetylenic unsaturation, i.e., $-C\equiv C-$, are preferred. Particularly preferred are halogen substituted saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen, $-O-$, oxacarbonyl oxygen, $$-\overset{\overset{\displaystyle O}{\|}}{C}-O-$$

carbonyl oxygen,

and the like.

Specific examples of monoepoxides include epichlorohydrins such as epichlorohydrin, epibromohydrin, 1,2-epoxy - 1 - methyl - 3 - chloropropane, 1,2-epoxy-1-butyl-3-chloropropane, 1,2-epoxy-2-methyl - 3 - fluoropropane, and the like.

Illustrative diepoxides include diethylene glycol bis (3,4-epoxycyclohexane-carboxylate), bis(3,4-epoxycyclohexylmethyl)adipate, bis(3,4 - epoxycyclohexylmethyl) phthalate, 6-methyl-3,4-epoxycyclohexylmethyl 6-methyl-3,4-epoxycyclohexane carboxylate, 2-chloro-3,4-epoxycyclohexylmethyl 2-chloro-3,4-epoxycyclohexanecarboxylate, diglycidyl ether, bis(2,3-epoxycyclopentyl)ether, 1,5-pentanediol bis(6-methyl-3,4-epoxycyclohexylmethyl) ether, bis(2,3 - epoxy - 2 - ethylhexyl)adipate, diglycidyl maleate, diglycidyl phthalate, 3-oxatetracyclo $$[4\cdot4\cdot0\cdot1^{7,10}\cdot0^{2,4}]$$

undec-8-yl 2,3-epoxypropyl ether, bis(2,3-epoxycyclopentyl)sulfone, bis(3,4-epoxyhexoxypropyl)sulfone, 2,2'-sulfonyldiethyl, bis(2,3-epoxycyclopentanecarboxylate), 3-oxatetracyclo[4·4·0·1⁷,¹⁰·0²,⁴]undec-8 - yl 2,3 - epoxybutyrate, 4-pentenal-di(6-methyl - 3,4 - epoxycyclohexylmethyl)acetal, ethylene glycol bis(9,10-epoxystearate), diglycidyl carbonate, bis(2,3-epoxybutylphenyl)-2-ethylhexyl phosphate, diepoxydioxane, butadiene dioxide and 2,3-dimethyl butadiene dioxide. The preferred diepoxides are those wherein each of the oxirane groups is connected to an electron donating substituent which is not immediately connected to the carbon atoms of that oxirane group. Such diepoxides have the grouping

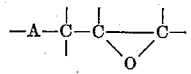

wherein A is an electron donating substituent such as

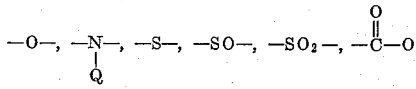

or

and Q is a saturated hydrocarbon radical such as an alkyl, cycloalkyl, aryl or aralkyl radical.

A single monoepoxide or diepoxide or a mixture of at east two monoepoxides or diepoxides can be employed in preparing thermoplastic polyhydroxyethers and the terms "monoepoxide" and "diepoxide" are intended to include a mixture of at least two monoepoxides or diepoxides, respectively.

The termoplastic polyhydroxyether adhesive compositions of this invention can be prepared by any of the blending or mixing means conventionally used to mix or compound thermoplastics. For example, suitable techniques include codissolving and blending of solutions of the components, working in a Banbury mixer, a compounding extruder, or on a roll mill or in equivalent apparatus. Fluxing the adhesive composition components during a portion of the mixing in these apparatuses is preferred to insure homogeneity of the final composition.

Broad ranges of poly(vinyl alkyl ether) concentration in polyhydroxyether are suitable. The particular concentrations desired for a specific application will depend primarily on the melt flow (molecular weight) of the polyhydroxyether, and the reduced viscosity (molecular weight) of the particular poly(vinyl alkyl ether) being employed. In general, from about 2 parts to about 50 parts or higher up to 80 parts of poly(vinyl alkyl ether) per 100 parts of the polyhydroxyether/poly(vinyl alkyl ether) adhesive composition provides substantial reductions in bonding temperature without undue modification of the desirable properties of the polyhydroxyether. High molecular weight (low melt flow) polyhpdroxyether requires less poly(vinyl alkyl ether) to obtain the benefits of this invention. Thus in a 0.5 to 3.0 melt flow polyhydroxyether there is desirably employed from 25 to 50 parts of a quite low molecular weight poly(vinyl alkyl ether) (0.3 reduced viscosity) per 100 parts of the composition, whereas a polyhydroxyether of a 6.0 melt flow desirably is blended with about 5 parts of a 0.3 reduced viscosity poly(vinyl alkyl ether) per 100 parts of the composition to achieve equal bonding temperature reduction with equivalent bond strengths.

The invention is illustrated by the following examples wherein all proportions, parts, and percentages are by weight unless otherwise stated. Melt flow of each of the thermoplastic polyhydroxyethers was determined by weighing in grams of the amount of polyhydroxyether which, at a temperature of 220° C. and under a pressure of 44 p.s.i., flowed through an orifice having a diameter of 0.0825″ and a length of 0.315″ over a ten minute period. Four such determinations were made and the average of the four determinations is reported as decigrams per minute under a pressure of 44 p.s.i. and at 220° C.

Example 1

The thermopalstic polphydroxyether used was prepared by the reaction of equimolar amounts of 2,2-bis(4-hydroxyphenyl)propane and epichlorohydrin together with sodium hydroxide. Equipment used was a two liter, three necked flask provided with a sealed stirrer, thermometer, and reflux condenser. There was placed in the flask:

| | Grams |
|---|---|
| 2,2-bis(4-hydroxyphenyl)propane (0.5 mole) | 114.5 |
| Epichlorohydrin (99.1%) pure (0.5 mole) | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty milliliters of a 7:3 mixture of toluene:butanol was added to the flask. Heating of the mixture at 80° C. was continued another two hours. There was added to the flask an additional 50 millimiters of the 7:3 toluene:butanol mixture and 4.5 grams of phenol. The contents of the flask were continued heated at 80° C. (reflux) for 2½ hours. Upon cooling, the reaction mixture was cut with 200 milliliters of the 7:3 toluene:butanol mixture. One hundred milliliters of water was added to the flask and agitated with the contents to dissolve salts present in the reaction mixture. The flask contents were allowed to settle for ten minutes during which time a lower brine phase formed. This lower phase was separated by decantation. The upper polymer solution containing phase was washed successfully with two 160 milliliters portions of water containing 4.5% butanol. The washed polymer solution was acidified by stirring the solution with a mixture of 1 milliliter of 85% phosphoric acid with 100 milliliters of water (pH=2) for one hour. The upper polymer solution phase was again separated by decantation and water washed with four successive 200 milliliter portions of water containing 4.5% butanol. The washed polymer was then coagulated in one liter of isopropanol, filtered, and dried. There was obtained a thermoplastic polyhydroxyether of 2,2-bis(4-hydroxyphenyl)propane and epichlorohydrin having a melt flow of 7.0 decigrams per minute.

In 90 parts of tetrahydrofuran, there was dissolved 9.5 parts of the above prepared thermoplastic polyhydroxyether and 0.5 part of a poly(vinyl ethyl ether) have a specific gravity at 20° C. of 0.973 and a reduced viscosity at 20° C. of .3±.1 measured as a one tenth gram sample in 100 milliliters of benzene as the solvent. This 5% poly(vinyl ethyl ether) 95% polyhydroxyether mixture was dissolved with agitation and, before separation could occur, the solution was applied to aluminum strips 0.063″ thick which had been cleaned by wiping with methyl ethyl ketone and immersing successively for 10 minutes in 85% phosphoric acid, n-butyl alcohol, and tap water and rinsing with tap water. The aluminum strips measured one inch wide by 4 inches long and were Alclad 2024T3 alloy. A thickness of two to three mils of the thermoplastic polyhydroxyether adhesive composition was built up on the ends of the aluminum strips by coating with the solution and then baking 15 minutes at 170° F. and 5 minutes at 300° F. The coated ends of the aluminum strips were overlapped to give a thickness of adhesive of 4 to 6 mils. The assembly was pressed at low pressure between platens of a steam press. The temperature of the steam press was 365° F. Bonding time was 60 seconds. Thereafter, the strips were cooled in the press. The bonds were tested for lap shear strength in accordance with ASTM D-1002. The average lap shear strength for 5 specimens was 3490 p.s.i.

A control (I) was also run using a polyhydroxyether without the addition of a poly(vinyl alkyl ether). Again bonding was at 365° F. for 60 seconds. Bonds having a lap shear strength of 1800 p.s.i. were obtained. Another control (II) was run again using polyhydroxyether without an additive but bonding was at 700° F. for 40 seconds. The lap shear strength was 2700 p.s.i.

Example 2

Using the polyhydroxyether of Example 1, a mixture was prepared by milling 90 parts of the polyhydroxyether on a two roll mill (365° F. back roll, 330° F. front roll) and slowly adding 10 parts of a poly(vinyl ethyl ether) having a specific gravity at 20° C. of 0.968 and a reduced viscosity of 5.0±0.5 measured as in Example 1. Milling was continued until a uniform milky white mass was obtained. This was sheeted off and pressed into eight mil thick plaques. These were tested for adhesion to aluminum prepared as in Example 1 after bonding at 500° C. and 400 p.s.i. for 90 seconds. The average bond strength for five samples was 4070 p.s.i. A control (II) of straight polyhydroxyether similarly prepared had a bond strength after bonding at these conditions of 1500 p.s.i.

*Example 3*

The composition of Example 2 was extruded into 0.5 mil film and lengths thereof were laminated to each of 5 mil stainless steel strips and 23.5 mil cold rolled steel sheets by ironing with a silicone rubber roll. Each coated surface was then heated and the preheated surfaces were laminated together at 500° F. for 40 seconds at a moderate uniform pressure.

One inch wide laminate samples were tested in accordance with ASTM D–903 for peel strength by pulling back the stainless steel lamina at a 180° angle.

Peel strength was 22–26 pounds per inch of width. A control (III) of straight polyhydroxyether had a peel strength of 8–10 pounds.

*Examples 4–6*

Using a polyhydroxyether prepared as in Example 1 but having a melt flow of 6, a series of compositions was prepared as in Example 1 using per 100 parts of the total of polyhydroxyether and poly(vinyl ethyl ether) 5 parts (Example 4), 10 parts (Example 5) and 25 parts (Example 6) of a poly(vinyl ethyl ether) having a 0.3±0.1 reduced viscosity measured as in Example 1. A control was also run. Test specimens were prepared by laminating as in Example 1 at temperatures of 365° F. and for 60 seconds. Lap shear strength testing was then carried out.

Results were as follows:

| Example | Parts | | Lap Shear Strength ASTM (p.s.i.) D-1002 |
|---|---|---|---|
| | Polyhydroxyether | Poly(Vinyl Ethyl Ether) | |
| Control | 100 | 0 | 1,800 |
| 4 | 95 | 5 | 3,500 |
| 5 | 90 | 10 | 2,700 |
| 6 | 75 | 25 | 2,700 |

*Examples 7–11*

A series of examples were run as in Examples 4–6 but using a 2.5 melt flow polyhydroxyether and per 100 parts of the composition 5 (Example 7); 10 (Example 8); 10 (Example 9); 25 (Example 10); and 50 (Example 11) parts of the 0.3 reduced viscosity poly(vinyl ethyl ether).

Results were as follows:

| Example | Parts | | Lap Shear Strength ASTM (p.s.i.) D-1002 |
|---|---|---|---|
| | Polyhydroxyether | Poly(Vinyl Ethyl Ether) | |
| Control | 100 | 0 | 1,130–1,200 |
| 7 | 95 | 5 | 2,290 |
| 8 | 90 | 10 | 1,850 |
| 9 | 90 | *10 | 2,320 |
| 10 | 75 | 25 | 3,370 |
| 11 | 50 | 50 | 3,240 |
| Control | 0 | 100 | 0 |

*Blend of 2 parts 0.3 R.V. and 8 parts 5.0 R.V. poly(vinyl ethyl ether).

*Example 12*

Example 8 was duplicated but using the 5.0 reduced viscosity poly(vinyl ethyl ether) of Example 2. Lap shear strength was 2550 p.s.i. The control was 1130–1200 p.s.i.

*Examples 13–14*

Example 12 was duplicated but using a 6 melt flow polyhydroxyether having a lap shear strength of 1500 p.s.i. when bonded at 450° F. containing 10 (Example 13) and 25 (Example 14) parts poly(vinyl ethyl ether). The blend of Example 13 had a lap shear strength of 4070 p.s.i. and that of Example 14 a lap shear strength of 3080 p.s.i. when bonded at 450° F.

*Examples 15–16*

Example 13 is duplicated but substituting for the polyhydroxyether a 6 melt flow poly(hydroxyether-dihydroxyether) prepared as in Example 1 but with the substitution of 0.25 mole of butadiene dioxide for 0.25 mole of epichlorohydrin (Example 15), and with the substitution of a 6 melt flow polyhydroxyether prepared as in Example 1 but using 0.5 mole of the diglycidyl ether of 2,2-bis(4-hydroxyphenyl)propane for all the epichlorohydrin (Example 16). An improvement in bond strengths is noted at lower bonding temperatures of the blended polyhydroxyethers over the unblended polyhydroxyethers.

What is claimed is:

1. Adhesive composition which develops high bond strengths at relatively low bonding temperatures comprising a mixture of from 20 to 98 parts by weight of thermoplastic polyhydroxyether reaction product of substantially equimolar amounts of a dihydric phenol and epichlorohydrin, said thermoplastic polyhydroxyether having a degree of polymerization of at least 30, and from 2 to 80 parts by weight of poly(vinyl alkyl ether) per 100 parts by weight of the mixture.

2. Adhesive composition which develops high bond strengths at relatively low bonding temperatures comprising a mixture of from 50 to 98 parts by weight of thermoplastic polyhydroxyether reaction product of substantially equimolar amounts of a dihydric phenol and epichlorohydrin, said thermoplastic polyhydroxyether having a degree of polymerization of at least 30, and from 2 to 50 parts by weight of poly(vinyl alkyl ether) wherein the alkyl group contains from 1 to 12 carbon atoms inclusive per 100 parts by weight of the mixture.

3. Adhesive composition which develops high bond strengths at relatively low bonding temperatures comprising a mixture of from 50 to 98 parts by weight of thermoplastic polyhydroxyether reaction product of substantially equimolar amounts of a dihydric phenol and epichlorohydrin, said thermoplastic polyhydroxyether having a degree of polymerization of at least 30, and from 2 to 50 parts by weight of a poly(vinyl ethyl ether) having a reduced viscosity from 0.25 to 6.0 measured at 20° C. as a 0.1 gram sample in 100 milliliters of benzene per 100 parts by weight of the mixture.

4. Composition claimed in claim 3 wherein the thermoplastic polyhydroxyether has a melt flow of 0.5 to 3, the poly(vinyl ethyl ether) has a reduced viscosity of about 0.3 and is present in an amount of from 25 to 50 parts by weight per 100 parts by weight of the mixture.

5. Composition claimed in claim 3 wherein the thermoplastic polyhydroxyether has a melt flow of about 6, the poly(vinyl ethyl ether) has a reduced viscosity of about 0.3 and is present in an amount of about 5 parts by weight per 100 parts of the mixture.

6. Adhesive composition which develops high bond strengths at relatively low bonding temperatures comprising a mixture of from 75 to 90 parts by weight of thermoplastic polyhydroxyether reaction product of substantially equimolar amounts of a dihydric phenol and epichlorohydrin, said thermoplastic polyhydroxyether having a degree of polymerization of at least 30, and from 10 to 25 parts by weight of a poly(vinyl ethyl ether) having a reduced viscosity from 0.25 to 6.0 measured at 20° C. as a 0.1 gram sample in 100 milliliters in benzene per 100 parts by weight of the mixture.

7. A structural element exhibiting improved bond strength comprising an adherend selected from the class consisting of glass, paper, wood and metal adherends and adhering thereto an adhesive composition comprising a mixture of from 20 to 98 parts by weight of thermoplastic polyhydroxyether reaction product of substantially equimolar amounts of a dihydric phenol and epichlorohydrin, said thermoplastic polyhydroxyether having a degree of polymerization of at least 30, and from 2 to 80 parts by weight of poly(vinyl alkyl ether) per 100 parts by weight of the mixture.

8. A structural element exhibiting improved bond strength comprising an adherend selected from the class consisting of glass, paper, wood and metal adherends and adhering thereto an adhesive composition comprising a mixture of from 50 to 98 parts by weight of thermoplastic polyhydroxyether reaction product of substantially equimolar amounts of a dihydric phenol and epichlorohydrin, said thermoplastic polyhydroxyether having a degree of polymerization of at least 30, and from 2 to 50 parts by weight poly(vinyl alkyl ether) per 100 parts by weight of the mixture.

9. A structural element exhibiting improved bond strength comprising an adherend selected from the class consisting of glass, paper, wood and metal adherends and adhering thereto an adhesive composition comprising a mixture of from 75 to 90 parts by weight of thermoplastic polyhydroxyether reaction product of substantially equimolar amounts of a dihydric phenol and epichlorohydrin, said thermoplastic polyhydroxyether having a degree of polymerization of at least 30, and from 10 to 25 parts by weight of poly(vinyl alkyl ether) per 100 parts by weight of the mixture.

10. A structural element comprising a metal adherend and adhering thereto an adhesive composition comprising a mixture of from 75 to 90 parts by weight of thermoplastic polyhydroxyether reaction product of substantially equimolar amounts of a dihydric phenol and epichlorohydrin, said thermoplastic polyhydroxyether having a degree of polymerization of at least 30, and from 10 to 25 parts by weight of poly(vinyl alkyl ether) wherein the alkyl group contains from 1 to 12 carbon atoms inclusive per 100 parts by weight of the mixture.

11. A structural element having improved bond strength comprising at least one steel adherend and at least one stainless steel adherend said adherends being bonded together with an adhesive composition comprising a mixture of from 50 to 98 parts by weight of thermoplastic polyhydroxyether reaction product of substantially equimolar amounts of a dihydric phenol and epichlorohydrin, said thermoplastic polyhydroxyether having a degree of polymerization of at least 30, and from 2 to 50 parts by weight of poly(vinyl alkyl ether) wherein the alkyl group contains from 1 to 12 carbon atoms inclusive per 100 parts by weight of the mixture.

12. A structural element having improved bond strength comprising at least one steel adherend and at least one stainless steel adherend said adherends being bonded together with an adhesive composition comprising a mixture of from 50 to 98 parts by weight of thermoplastic polyhydroxyether reaction product of substantially equimolar amounts of a dihydric phenol and epichlorohydrin, said thermoplastic polyhydroxyether having a degree of polymerization of at least 30, and from 2 to 50 parts by weight of poly(vinyl ethyl ether) having a reduced viscosity of from 0.25 to 6.0 measured at 20° C. as a 0.1 gram sample in 100 milliliters of benzene wherein the alkyl group contains from 1 to 12 carbon atoms inclusive per 100 parts by weight of the mixture.

13. Method of achieving high peel strength bonds between adherends helected from the class consisting of glass, paper, wood and metal adherends comprising placing between opposing faces of a pair of adherends an adhesive composition comprising a mixture of from 50 to 98 parts by weight of thermoplastic polyhydroxyether reaction product of substantially equimolar amounts of a dihydric phenol and epichlorohydrin, said thermoplastic polyhydroxyether having a degree of polymerization of at least 30, and from 2 to 50 parts by weight of poly(vinyl alkyl ether), maintaining said faces in abutting contact with the adhesive, subjecting the adherend-adhesive-adherend assembly to a temperature sufficient to cause the adhesive to bond and cooling the assembly.

No references cited.

ALEXANDER WYMAN, *Primary Examiner.*

R. J. ROCHE, *Assistant Examiner.*